United States Patent [19]
Gavin, Jr.

[11] 4,150,465
[45] Apr. 24, 1979

[54] INSULATION FASTENING ASSEMBLY

[75] Inventor: Edmond P. Gavin, Jr., Madison, Conn.

[73] Assignee: Olin Corporation, New Haven, Conn.

[21] Appl. No.: 863,184

[22] Filed: Dec. 22, 1977

Related U.S. Application Data

[63] Continuation of Ser. No. 676,190, Apr. 12, 1976.

[51] Int. Cl.² .............................................. A44B 9/00
[52] U.S. Cl. ......................................... 24/85 B; 85/51; 24/211 K; 403/353; 52/811; 52/747
[58] Field of Search ......................... 85/51; 24/211 K; 403/353; 52/410, 741, 361, 363, 747, 748, 509, 512, 811

[56] References Cited

U.S. PATENT DOCUMENTS

| | | | |
|---|---|---|---|
| 1,511,900 | 10/1924 | Mandis | 24/211 K |
| 3,523,395 | 8/1970 | Rutter et al. | 52/410 |
| 3,606,722 | 9/1971 | Fitzpatrick | 52/747 |

FOREIGN PATENT DOCUMENTS

| | | | |
|---|---|---|---|
| 259193 | 2/1964 | Australia | 24/211 K |
| 470472 | 1/1929 | Fed. Rep. of Germany | 24/211 K |
| 2361284 | 6/1975 | Fed. Rep. of Germany | 403/231 |
| 488075 | 3/1970 | Switzerland | 403/353 |

*Primary Examiner*—Wayne L. Shedd
*Attorney, Agent, or Firm*—William W. Jones; Paul J. Lerner

[57] ABSTRACT

An assembly for fastening an insulation batt to a supporting surface. The fastening assembly includes an elongated fastener which is driven into the supporting surface with the head end of the fastener protruding from the supporting surface a distance approximately equal to the thickness of the batt of insulation. The batt is then impaled upon the protruding fastener and pushed down thereon until the head of the fastener protrudes from the surface of the batt remote from the supporting surface. A planar locking clip having a keyhole-shaped opening is then slipped over the fastener head and wedged between the fastener head and the batt. The locking clip is held in place by engagement with the fastener head, and prevents the insulation batt from pulling away from the supporting surface.

6 Claims, 3 Drawing Figures

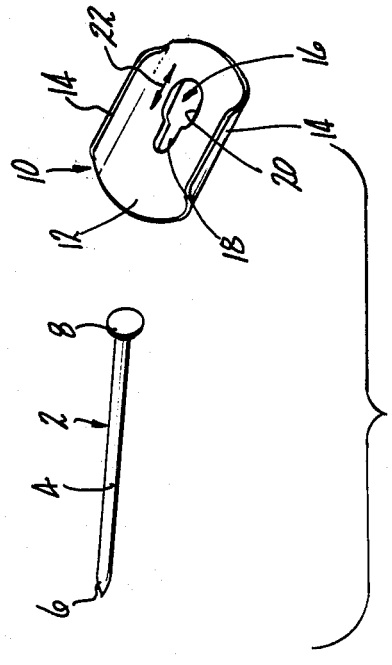
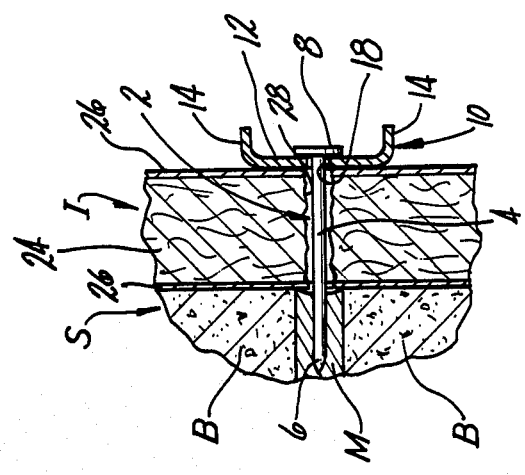
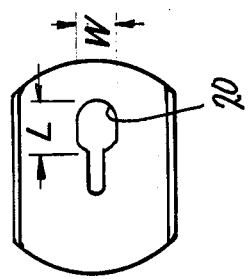

INSULATION FASTENING ASSEMBLY

This is a continuation of application Ser. No. 676,190, filed Apr. 12, 1976.

This invention relates to an assembly and a method for securing a resiliently compressible material, such as insulation batting, on a supporting surface. More particularly, this invention involves the use of an elongated headed fastener and a planar locking member to secure the material to the supporting surface.

Insulation batting, and other similar material, has, heretofore, been secured to supporting surfaces by means of headed nails which are driven through the batting into the underlying supporting surface. The nail head then serves to hold the batting against tearing away from the supporting surface. Another method used to secure insulation batting to a supporting surface involves the firing of staples through flaps formed on the edges of the batting. Both of these prior art methods suffer from potential problems in that both involve the use of blind setting of the fasteners into the supporting surface, e.g. the batting covers the supporting surface so that one cannot see exactly where the fasteners are entering the supporting surface. Both of the prior art methods also provide relatively poor securement of the batting to the supporting surface wherein the batting can be relatively easily torn away from the supporting surface.

The method and assembly of this invention provide for easy securement of the batting or similar material to a supporting surface, and provide a securement which will not allow the batting to be easily torn away from the supporting surface.

One aspect of this invention relates to the prevention of tearing of the batting away from the supporting surface. To this end, the fasteners used are headed nails which pierce the batting and enter the supporting surface. The heads of the nails are flush with the outer surface of the batting. A planar locking member in the form of a clip with a slot in it through which the shank of the nail passes is positioned adjacent to the batting and is biased by the batting against the nail head. The locking member provides a large surface area for engagement with the soft batting. The locking member is installed by pressing the batting down, properly positioning the locking member, and allowing the batting to spring back and press the locking member against the nail head. Preferably, the locking clip is provided with an elliptical opening through which the nail head can only pass when the locking clip is tilted with respect to the nail head. When in place, the batting holds the locking clip parallel to the nail head so that the latter cannot pass back through the elliptical opening.

Another aspect of this invention relates to the elimination of the need to blind set the fasteners into the supporting surface, when such a procedure would be undesirable. Such an occasion is when the insulation batting is to be installed directly over a brick wall, for example. In such a situation, it is desirable to set the nails in the mortar joints between the bricks rather than in the bricks themselves. This is true because of the relative hardness of the bricks and the compressability of the mortar. Oftentimes the bricks are actually harder than the nails so that driving the nails into the bricks is difficult to impossible. Thus the nails should be driven only into the mortar joints between bricks. In blind setting, however, the batting covers the supporting surface so that one cannot be sure that the nails are being driven into the mortar. By using the assembly of this invention, one can drive the nails into the supporting surface and into the mortar joints before the batting is laid over the supporting surface. Thus a network of nails is driven into the mortar joints according to a predetermined plan and the batting is then impaled on the nail network. The batting is pushed down until the nail heads pop through the batting layer at which time the locking clips are mounted on the nails to prevent the batting from slipping off of the nails upon which it has been impaled.

It is, therefore, an object of this invention, to provide an assembly and method for securing a resilient layer of material to a supporting surface through the use of headed nails and planar locking members mountable on the nails.

It is a further object of the invention to provide an assembly and method of the character described wherein the material is held more securely to the surface than with nails alone or with staples.

It is yet another object of this invention to provide an assembly and method of the character described wherein tearing of the material away from the surface is prevented.

It is still another object of this invention to provide an assembly and method of the character described wherein blind setting of the nails into the surface through the material is not necessary to secure the material to the surface.

These and other objects and advantages of the invention will become more readily apparent to those skilled in the art from the following detailed description of a preferred embodiment of the invention taken in conjunction with the accompanying drawings, in which:

FIG. 1 is an exploded perspective view of a preferred embodiment of a fastening assembly formed in accordance with the invention;

FIG. 2 is a sectional view of the assembly of FIG. 1 shown securing a batting of insulation to a supporting surface of bricks and mortar; and FIG. 3 is a top plan view of the planar locking clip part of the assembly of FIG. 1.

Referring now to the drawings, the fastener assembly of this invention includes a nail part 2 having an elongated shank 4, of substantially constant cross-section a pointed end 6, and a radially enlarged head 8 at the other end. The nail head 8 will be formed with a predetermined diameter as will be explained further hereinafter. The fastener assembly also includes a planar locking clip 10 which is formed from sheet material and has a central web portion 12 and opposed upwardly bent ears 14 to facilitate manual installation. The ears 14 permit the clip to be grasped during installation of the fastener assembly. A slot 16 is provided through the web 12 and includes a restricted part 18 which opens into an elliptical enlarged part 20. The enlarged part 20 of the slot 16 is elongated in the direction of the arrow 22. Once the nail 2 is driven into a supporting surface, the clip 10 is mounted on the nail 2 by tilting the clip sufficiently to allow the nail head 8 to pass through the enlarged part 20 of the clip slot 16. The clip is then tilted back so that the plane of the nail head 8 and the plane of the clip web 12 are parallel. The clip 10 is then slid laterally so that the nail shank 4 is positioned in the restricted part 18 of the clip slot 16. The width of the enlarged part 20 of the slot when measured in a direction perpendicular to the direction of the arrow 22 is smaller than the diameter of the nail head 8 so that the clip 10 cannot be pulled off of the nail 2 unless the clip is again tilted as it was when installed upon the nail. Referring to FIG. 3, it will be understood that the length L of the enlarged part 20 of the clip slot is slightly larger than the diameter of the nail head 8, and the width W of the enlarged part 20 of the clip slot is smaller than the diameter of the nail head 8.

Referring to FIG. 2, the fastener assembly is shown securing an insulation batt to a supporting surface S. The securement shown is the type achieved by the impaling technique previously described. The supporting surface or material S is a wall made up of bricks B and mortar joints M. It will be noted that the nail 2 has been driven into the mortar joint M between the bricks B. As previously described, a network of nails is driven in this fashion and the nails protrude from the supporting material S a distance approximately equal to the thickness of the insulation batt I. The insulation batt will be of any desirable construction or type, the type illustrated having a fibrous core 24 and paper facing sheets 26. The batt I is thus resilient in that a force can be applied normal to the sheets 26 and the core 24 will be compressed and rebound once the force is removed.

Once the nail network is set in the mortar joints M, the insulation batting is lifted and properly aligned with the wall. The batting is then impaled on the nail network and pushed against the wall until the nail heads 8 pop through the outer facing sheet 26. It will be noted that the nail heads 8 gouge out a tunnel 28 through the batting I and that, were no further steps taken, the insulation would loosen and fall off of the nails. Once the nail head pops through the outer facing sheet, the batting is pushed toward the wall around the nail, and the locking clip 10 is mounted on the nail 2 in the manner previously described. The batting is then released and, due to its inherent resiliency, it rebounds or springs back to its original thickness. Thus the batting pushes the clip web 12 against the nail head 8 and holds the web 12 parallel to the nail head 8. As previously noted, as long as the web 12 is parallel to the nail head 8, the clip 10 cannot fall or be pulled off the nail 2. Thus the fastening assembly components stay connected and the batting I is secured to the wall S.

It will be appreciated that the fastening assembly of this invention provides for a more secure and stable connecting of the insulation batting to the supporting surface. The need to blind set the nails is also eliminated and a new method in installation is made possible wherein the nails are set in the supporting surface before the insulation layer is positioned over the supporting surface. After a nail network is preset, the insulation is impaled on the nail network and the clips are secured to the protruding nails.

Since many changes and variations of the disclosed embodiment of the invention may be made without departing from the inventive concept, it is not intended to limit the invention otherwise than as required by the appended claims.

What is claimed is:

1. A fastening assembly for use in blind fastening a resilient and compressible sheet-like layer of material to a supporting surface, said assembly comprising: a nail-like fastener having an elongated shank of substantially constant cross-section, a pointed end, and a radially expanded head end of predetermined diameter; and a planar clip member formed with a slot for receiving the fastener shank, said slot having a length which is greater than the diameter of said fastener head and consisting of a restricted part which opens into an elliptical part, each of said parts having a width which is less than the diameter of said fastener head but greater than the diameter of said fastener shank, said elliptical part having a width greater than the width of said restricted part and a length greater than the diameter of said fastener head.

2. The fastener assembly of claim 1, wherein said slot is completely contained within said clip member.

3. A fastening assembly for use in securing resiliently compressible insulation batting to a supporting surface, said assembly comprising: a nail-like fastener having an elongated shank and a radially expanded head of predetermined diameter; and a planar clip member formed with a web containing a slot for receiving the fastener shank, said slot consisting of an elliptical portion and a restricted portion communicating therewith, said elliptical portion having a length which is greater than its width, the length of the elliptical portion being greater than the diameter of the fastener head, and the width of the elliptical portion being less than the diameter of the fastener head but greater than the diameter of said fastener shank whereby said elliptical portion provides means for preventing the clip from being drawn over the fastener head so long as said web is parallel to the fastener head, said means also permitting said fastener head to be passed through said slot when said web is tilted at an angle to said fastener head, said restricted portion having a width greater than the diameter of said fastener shank but less than the width of said elliptical portion.

4. A fastening assembly comprising a planar batt of resiliently compressible material; a nail-like fastener having a shank of sufficient length to pass through said batt and into a supporting surface to which said batt is to be affixed, said fastener having a radially expanded head of predetermined diameter; and a clip having a planar web containing slot means operable to receive said fastener shank and to pass said fastener head when said web is tilted at an angle with respect to said fastener head, and operable to prevent passage of said fastener head when said web is parallel to said fastener head; said resiliently compressible material being operable to bias said clip into parallel contact with said fastener head.

5. In combination with a supporting surface; a planar batt of resiliently compressible material overlying said supporting surface; a nail-like fastener piercing said batt and penetrating said supporting surface, said fastener having a radially expanded head positioned adjacent to an outer surface of said batt; and a planar clip having a slot through which said fastener extends, said clip being sandwiched between said batt and said fastener head and biased against said fastener head by said batt.

6. A method of securing a sheet-like batt of resiliently compressible material, such as insulation, to a supporting surface, comprising the steps of:
   (a) driving a network of fasteners into the supporting surface in a predetermined pattern, with the fasteners protruding from the supporting surface for a distance approximately equal to the thickness of the batt;
   (b) impaling the batt on the fastener network to an extent wherein fastener heads protrude through the outermost surface of the batt;
   (c) compressing the batt in areas around the protruding fastener heads to allow planar clip members to be mounted on the fasteners between the batt and the fastener heads;
   (d) positioning planar clip members about the fastener shanks between the fastener heads and the batt; and,
   (e) releasing the batt from compression to enable the batt to rebound sufficiently to bias the clip members against the fastener heads.

* * * * *